(12) United States Patent
Bierner et al.

(10) Patent No.: US 9,646,079 B2
(45) Date of Patent: May 9, 2017

(54) METHOD AND APPARATUS FOR IDENTIFIYING SIMILAR QUESTIONS IN A CONSULTATION SYSTEM

(75) Inventors: Gann Bierner, Oakland, CA (US); Edwin Cooper, Oakland, CA (US)

(73) Assignee: Pearl.com LLC, San Francisco, CA (US)

( * ) Notice: Subject to any disclaimer, the term of this patent is extended or adjusted under 35 U.S.C. 154(b) by 48 days.

(21) Appl. No.: 13/464,230

(22) Filed: May 4, 2012

(65) Prior Publication Data
US 2013/0297625 A1 Nov. 7, 2013

(51) Int. Cl.
*G06F 17/30* (2006.01)

(52) U.S. Cl.
CPC .. *G06F 17/30634* (2013.01); *G06F 17/30864* (2013.01)

(58) Field of Classification Search
USPC ........................................................ 707/754
See application file for complete search history.

(56) References Cited

U.S. PATENT DOCUMENTS

| | | |
|---|---|---|
| 5,384,703 A | 1/1995 | Withgott et al. |
| 5,566,302 A | 10/1996 | Khalidi et al. |
| 5,642,520 A | 6/1997 | Takeshita et al. |
| 5,918,240 A | 6/1999 | Kupiec et al. |
| 5,937,422 A | 8/1999 | Nelson et al. |
| 5,960,383 A | 9/1999 | Fleischer |
| 6,018,543 A | 1/2000 | Blois et al. |
| 6,029,195 A | 2/2000 | Herz |
| 6,144,672 A | 11/2000 | Brauner |
| 6,172,675 B1 | 1/2001 | Ahmad et al. |
| 6,173,279 B1 | 1/2001 | Levin et al. |
| 6,212,494 B1 | 4/2001 | Boguraev |
| 6,223,165 B1 | 4/2001 | Lauffer |
| 6,289,304 B1 | 9/2001 | Grefenstette |
| 6,629,097 B1 | 9/2003 | Keith |
| 6,638,317 B2 | 10/2003 | Nakao |
| 6,754,654 B1 | 6/2004 | Kim et al. |
| 6,823,325 B1 | 11/2004 | Davies et al. |
| 6,871,199 B1 | 3/2005 | Binnig et al. |
| 6,963,830 B1 | 11/2005 | Nakao |
| 7,013,325 B1 | 3/2006 | Vivian et al. |
| 7,058,626 B1 | 6/2006 | Pan et al. |
| 7,146,128 B2 | 12/2006 | Okubo |
| 7,146,358 B1 | 12/2006 | Gravano et al. |
| 7,200,808 B1 | 4/2007 | Nagao |

(Continued)

FOREIGN PATENT DOCUMENTS

| | | |
|---|---|---|
| CN | 101320374 A | 12/2008 |
| JP | 2004086583 A | 3/2004 |

(Continued)

OTHER PUBLICATIONS

Saggion, Horacio. "Identifying Definitions in Text Collections for Question Answering." LREC. 2004.*

(Continued)

*Primary Examiner* — Nan Hutton
(74) *Attorney, Agent, or Firm* — Zilka-Kotab, P.C.

(57) ABSTRACT

Embodiments of the present invention further provide systems and methods for automatically identifying questions on topics similar to a newly submitted question to an online the consultation system.

10 Claims, 7 Drawing Sheets

(56) References Cited

U.S. PATENT DOCUMENTS

| | | |
|---|---|---|
| 7,209,908 B2 | 4/2007 | Li et al. |
| 7,289,982 B2 | 10/2007 | Saito et al. |
| 7,376,893 B2 | 5/2008 | Chen et al. |
| 7,454,393 B2 | 11/2008 | Horvitz et al. |
| 7,516,113 B2 | 4/2009 | Horvitz et al. |
| 7,672,831 B2 | 3/2010 | Todhunter et al. |
| 7,739,215 B2 | 6/2010 | Horvitz et al. |
| 7,783,622 B1* | 8/2010 | Vandermolen et al. ...... 707/708 |
| 7,831,688 B2 | 11/2010 | Linyard et al. |
| 7,962,326 B2 | 6/2011 | Tsourikov et al. |
| 8,005,665 B2 | 8/2011 | Chaney et al. |
| 8,046,472 B2 | 10/2011 | Kumar |
| 8,150,750 B2 | 4/2012 | Ray |
| 8,250,018 B2 | 8/2012 | Wong et al. |
| 8,280,888 B1 | 10/2012 | Bierner et al. |
| 8,332,394 B2 | 12/2012 | Fan et al. |
| 8,392,360 B1 | 3/2013 | Dicker et al. |
| 8,457,979 B2 | 6/2013 | Kurtzig et al. |
| 8,463,648 B1 | 6/2013 | Bierner et al. |
| 8,463,791 B1 | 6/2013 | Bierner et al. |
| 8,473,499 B2 | 6/2013 | Song et al. |
| 8,516,077 B2 | 8/2013 | Linyard et al. |
| 8,606,739 B2 | 12/2013 | Apacible et al. |
| 8,655,866 B1 | 2/2014 | Provine et al. |
| 8,732,222 B2 | 5/2014 | Horvitz et al. |
| 8,738,617 B2 | 5/2014 | Brown et al. |
| 8,954,358 B1 | 2/2015 | Zhang et al. |
| 9,275,038 B2 | 3/2016 | Bierner et al. |
| 2001/0021934 A1 | 9/2001 | Yokoi |
| 2002/0010574 A1 | 1/2002 | Tsourikov et al. |
| 2002/0023144 A1 | 2/2002 | Linyard et al. |
| 2002/0065857 A1 | 5/2002 | Michalewicz et al. |
| 2002/0087314 A1 | 7/2002 | Fischer et al. |
| 2002/0087496 A1 | 7/2002 | Stirpe et al. |
| 2002/0116176 A1 | 8/2002 | Tsourikov et al. |
| 2002/0184206 A1 | 12/2002 | Evans |
| 2003/0028525 A1 | 2/2003 | Santos et al. |
| 2003/0130837 A1 | 7/2003 | Batchilo et al. |
| 2003/0140037 A1 | 7/2003 | Deh-Lee |
| 2003/0144895 A1 | 7/2003 | Aksu et al. |
| 2003/0172368 A1 | 9/2003 | Alumbaugh et al. |
| 2003/0200079 A1 | 10/2003 | Sakai |
| 2004/0006560 A1 | 1/2004 | Chan et al. |
| 2004/0049499 A1 | 3/2004 | Nomoto et al. |
| 2004/0083224 A1 | 4/2004 | Yoshida |
| 2004/0158337 A1 | 8/2004 | Forest |
| 2004/0205448 A1 | 10/2004 | Grefenstette et al. |
| 2005/0055231 A1 | 3/2005 | Lee |
| 2005/0086290 A1 | 4/2005 | Joyce et al. |
| 2005/0131874 A1 | 6/2005 | Verbitsky |
| 2005/0182743 A1 | 8/2005 | Koenig |
| 2005/0266387 A1 | 12/2005 | Rossides |
| 2005/0278314 A1 | 12/2005 | Buchheit |
| 2006/0036563 A1 | 2/2006 | Wu |
| 2006/0041424 A1 | 2/2006 | Todhunter et al. |
| 2006/0106788 A1 | 5/2006 | Forrest |
| 2006/0149555 A1 | 7/2006 | Fabbrizio et al. |
| 2006/0167864 A1 | 7/2006 | Bailey et al. |
| 2006/0287970 A1 | 12/2006 | Chess et al. |
| 2006/0294037 A1 | 12/2006 | Horvitz et al. |
| 2007/0005564 A1 | 1/2007 | Zehner |
| 2007/0022109 A1 | 1/2007 | Imielinski et al. |
| 2007/0094006 A1 | 4/2007 | Todhunter et al. |
| 2007/0124266 A1 | 5/2007 | Hearing et al. |
| 2007/0143238 A1 | 6/2007 | Kochunni et al. |
| 2007/0160970 A1 | 7/2007 | Kaplan |
| 2007/0203863 A1 | 8/2007 | Gupta et al. |
| 2007/0239874 A1 | 10/2007 | Lazaridis et al. |
| 2007/0271256 A1 | 11/2007 | Chang et al. |
| 2008/0027783 A1 | 1/2008 | Hughes et al. |
| 2008/0064018 A1 | 3/2008 | Griffin |
| 2008/0077054 A1 | 3/2008 | Feuer et al. |
| 2008/0126280 A1 | 5/2008 | Liu et al. |
| 2008/0147741 A1 | 6/2008 | Gonen et al. |
| 2008/0160490 A1* | 7/2008 | Gomes et al. ................ 434/350 |
| 2008/0215976 A1 | 9/2008 | Bierner et al. |
| 2008/0243539 A1 | 10/2008 | Barish et al. |
| 2008/0270169 A1 | 10/2008 | Kibar et al. |
| 2008/0311934 A1 | 12/2008 | Soderstrom |
| 2009/0055384 A1 | 2/2009 | Jain et al. |
| 2009/0063463 A1 | 3/2009 | Turner et al. |
| 2009/0112912 A1 | 4/2009 | Schimmel et al. |
| 2009/0162824 A1 | 6/2009 | Heck |
| 2009/0177529 A1 | 7/2009 | Hadi |
| 2009/0192966 A1 | 7/2009 | Horvitz et al. |
| 2009/0204426 A1 | 8/2009 | Thorne et al. |
| 2009/0276419 A1 | 11/2009 | Jones et al. |
| 2010/0048229 A1 | 2/2010 | Rizzi |
| 2010/0057569 A1 | 3/2010 | Cantelmo et al. |
| 2010/0161785 A1 | 6/2010 | Xue et al. |
| 2010/0191686 A1 | 7/2010 | Wang et al. |
| 2010/0217603 A1 | 8/2010 | Hammond et al. |
| 2010/0235311 A1* | 9/2010 | Cao ................ G06F 17/30867 706/46 |
| 2011/0004588 A1 | 1/2011 | Leitersdorf et al. |
| 2011/0040592 A1 | 2/2011 | Kurtzig et al. |
| 2011/0040662 A1 | 2/2011 | Kurtzig |
| 2011/0040694 A1 | 2/2011 | Kurtzig et al. |
| 2011/0041173 A1 | 2/2011 | Kurtzig et al. |
| 2011/0078167 A1 | 3/2011 | Sundaresan et al. |
| 2011/0131210 A1 | 6/2011 | Bierner |
| 2011/0131283 A1 | 6/2011 | Canning et al. |
| 2012/0095978 A1* | 4/2012 | Levin et al. .................. 707/706 |
| 2012/0116844 A1 | 5/2012 | Menich et al. |
| 2012/0130910 A1* | 5/2012 | Al-Alami ...................... 705/304 |
| 2012/0131033 A1 | 5/2012 | Bierner |
| 2012/0185888 A1 | 7/2012 | Eyer et al. |
| 2012/0197813 A1 | 8/2012 | Kurtzig et al. |
| 2012/0197820 A1 | 8/2012 | Kurtzig et al. |
| 2012/0303356 A1 | 11/2012 | Boyle et al. |
| 2013/0041921 A1 | 2/2013 | Cooper et al. |
| 2013/0124532 A1* | 5/2013 | McQuarrie ................... 707/748 |
| 2013/0132308 A1 | 5/2013 | Boss et al. |
| 2013/0151236 A1 | 6/2013 | Iofinov |
| 2013/0166282 A1 | 6/2013 | Ridge et al. |
| 2013/0254153 A1 | 9/2013 | Marcheret |
| 2013/0268319 A1 | 10/2013 | Palombo |
| 2013/0290225 A1 | 10/2013 | Kamath et al. |
| 2013/0290342 A1 | 10/2013 | Cooper et al. |
| 2013/0295546 A1 | 11/2013 | Bierner et al. |
| 2013/0297545 A1 | 11/2013 | Bierner et al. |
| 2013/0297553 A1 | 11/2013 | Bierner |
| 2013/0304749 A1 | 11/2013 | Cooper |
| 2013/0311476 A1 | 11/2013 | Bierner |
| 2013/0311903 A1 | 11/2013 | Zadeh et al. |
| 2014/0003652 A1 | 1/2014 | Fedorovskaya et al. |
| 2014/0074826 A1 | 3/2014 | Cooper et al. |
| 2014/0114986 A1 | 4/2014 | Bierner et al. |
| 2014/0120513 A1 | 5/2014 | Jenkins et al. |
| 2014/0136567 A1 | 5/2014 | Bhalotia |
| 2014/0156365 A1 | 6/2014 | Porter et al. |

FOREIGN PATENT DOCUMENTS

| | | |
|---|---|---|
| WO | 2008077054 A1 | 6/2008 |
| WO | 2011019852 A1 | 2/2011 |

OTHER PUBLICATIONS

McNee, Sean M., Nishikant Kapoor, and Joseph A. Konstan. "Don't look stupid: avoiding pitfalls when recommending research papers." Proceedings of the 2006 20th anniversary conference on Computer supported cooperative work. ACM, 2006.*

Saraçoğlu, Ridvan, Kemal Tütüncü, and Novruz Allahverdi. "A fuzzy clustering approach for finding similar documents using a novel similarity measure." Expert Systems with Applications 33.3 (2007): 600-605.*

Yang et al., "Analyzing and Predicting Not-Answered Questions in Community-Based Question Answering Services," Proceedings of the Twenty-Fifth AAAI Conference on Artificial Intelligence, 2011, pp. 1273-1278.

(56) References Cited

OTHER PUBLICATIONS

Raben, D.R., "Self-Presentation and the Value of Information in Q&A Websites," Wiley INterscience, Aug. 7, 2009, pp. 2465-2473.
Liu et al., "You've got answers: Towards personalized models for predictingsuccess in community question answering," in Proceedings of the 46th Annual Meeting of the Association for Computational Linguistics (ACL), 2008, pp. 97-100.
Dror et al., "Will My Question be Answered? Predictiong "Question-Answerability" In Community Question-Answering Sites," Yahoo Labs, 2013, pp. 1-16.
Broder et al., "Syntatic Clustering of the Web," SRC Technical Note, Jul. 25, 1997, pp. 1-13.
Gharehchopogh et al., "Machine Learing based Question Classification Methods in Question Answering Systems," International Journal of Innovation and Applied Studies, vol. 4, No. 2, Oct. 2013, pp. 264-273.
Wei, L., "Question Classificaiton Using Language Modeling," CIIR Technical Report: University of Massachusetts, 2002, pp. 1-7.
Zhang et al., "Question Classification using Support Vector Machines", SIGIR, 2003, pp. 1-7.
Hermajakob, U., "Parsing and Question Classification for Question Answering", 2001, Proceedings of the Workshop on Open-Domain Question Answering at ACL, pp. 1-6.
Radev et al., "Probabilistic Question Answering on the Web," 2002, pp. 408-419.
Bierner et al., U.S. Appl. No. 13/946,982, filed Jul. 19, 2013.
Non-Final Office Action from U.S. Appl. No. 13/946,982, dated Jul. 15, 2014.
Final Office Action from U.S. Appl. No. 13/946,982, dated Dec. 8, 2014.
Advisory Action from U.S. Appl. No. 13/946,982, dated Mar. 23, 2015.
Final Office Action from U.S. Appl. No. 12/854,838, dated Mar. 20, 2015.
Final Office Action from U.S. Appl. No. 12/854,846, dated Apr. 7, 2015.
Kurtzig, A. P., U.S. Appl. No. 12/854,846, filed Aug. 11, 2010.
Non-Final Office Action from U.S. Appl. No. 12/854,846, dated Oct. 11, 2011.
Final Office Action from U.S. Appl. No. 12/854,846, dated Jun. 6, 2012.
Advisory Action from U.S. Appl. No. 12/854,846, dated Aug. 30, 2012.
Non-Final Office Action from U.S. Appl. No. 12/854,846, dated Dec. 18, 2014.
Kurtzig et al., U.S. Appl. No. 12/854,838, filed Aug. 11, 2010.
Non-Final Office Action from U.S. Appl. No. 12/854,838, dated Feb. 15, 2012.
Final Office Action from U.S. Appl. No. 12/854,838, dated Jul. 20, 2012.
Non-Final Office Action from U.S. Appl. No. 12/854,838, dated Oct. 2, 2014.
Kurtzig et al., U.S. Appl. No. 13/439,728, filed Apr. 4, 2012.
Non-Final Office Action from U.S. Appl. No. 13/439,728, dated Jul. 18, 2012.
Final Office Action from U.S. Appl. No. 13/439,728, dated Nov. 6, 2012.
Advisory Action from U.S. Appl. No. 13/439,728, dated Jan. 11, 2013.
Notice of Allowance from U.S. Appl. No. 13/439,728, dated Feb. 5, 2013.
Bierner et al., U.S. Appl. No. 13/464,167, filed May 4, 2012.
Non-Final Office Action from U.S. Appl. No. 13/464,167, dated Aug. 28, 2012.
Notice of Allowance from U.S. Appl. No. 13/464,167, dated Apr. 18, 2013.
Bierner et al., U.S. Appl. No. 13/464,196, filed May 4, 2012.
Notice of Allowance from U.S. Appl. No. 13/464,196, dated Aug. 13, 2012.
Bierner et al., U.S. Appl. No. 13/598,450, filed Aug. 29, 2012.

Notice of Allowance from U.S. Appl. No. 13/598,450, dated Feb. 26, 2013.
Bierner, G., U.S. Appl. No. 13/464,252, filed May 4, 2012.
Non-Final Office Action from U.S. Appl. No. 13/464,252, dated Jun. 11, 2014.
Bierner et al., U.S. Appl. No. 13/464,269, filed May 4, 2012.
Non-Final Office Action from U.S. Appl. No. 13/464,269, dated Apr. 25, 2014.
Bierner et al., U.S. Appl. No. 13/464,287, filed May 4, 2012.
Non-Final Office Action from U.S. Appl. No. 13/464,287, dated Jul. 10, 2014.
Palombo, G., U.S. Appl. No. 13/741,287, filed Jan. 14, 2013.
Non-Final Office Action from U.S. Appl. No. 13/741,287, dated Dec. 29, 2014.
Zadeh et al., U.S. Appl. No. 13/946,984, filed Jul. 19, 2013.
Bierner, G., U.S. Appl. No. 13/946,986, filed Jul. 19, 2013.
Cooper, E., U.S. Appl. No. 13/946,989, filed Jul. 19, 2013.
Porter et al., U.S. Appl. No. 14/176,007, filed Feb. 7, 2014.
Just Answer, Terms of Service, 2004-2005 JustAnswer! pp. 1-12 http://web.archive.org/web/20080509130156/http://www.justanswer.com/tos.aspx.
Just Answer, Expert FAQ's, 2004-2005 JustAnswer! pp. 1 http://web.archive.org/web/20070208193005/http://www.justanswer.com/help_expert.aspx.
Just Answer, Ask a Question, 2004-2005 Just Answer! pp. 1-2 http://web.archive.org/web/20080720171326/http://justanswer.com.
Just Answer, Expert Agreement, 2004-2005 JustAnswer! pp. 1-3 http://web.archive.org/web/20051127005457/http://www.justanswer.com/sa.asp.
International Preliminary Examination Report from International Application No. PCT/US2010/045232, dated Oct. 21, 2011.
International Search Report and Written Opinion from International Application No. PCT/US2010/045232, dated Oct. 1, 2010.
Supplementary European Search Report from EP Application No. 10808717.2, dated Jan. 21, 2014.
Coutu, A., "Consultation Fee Rates—Consultant Fees," Consultant Journal, May 26, 2006, pp. 1-5.
Phillips, M., "Get Expert Answers with JustAnswer," WebsiteMagazine.com, Aug. 29, 2008, pp. 1-2.
Huntington, D.; "Expert Systems for Online Advice: Knowledge at Your Fingertips," PCAI, Jul./Aug. 2000, pp. 26-27 and 49-50.
Muller et al., "Electronic Marketplaces of Knowledge: Characteristics and Sharing of Knowledge Assets," Proceedings of the International Conference on Advances in Infrastructure for e-Business, e-Education, e-Science, and e-Medicine on the Internet, Jan. 2002, pp. 1-12.
Non-Final Office Action from U.S. Appl. No. 13/464,252, dated Jan. 14, 2015.
Non-Final Office Action from U.S. Appl. No. 13/464,269, dated Jan. 26, 2015.
Non-Final Office Action from U.S. Appl. No. 13/464,287, dated Jan. 29, 2015.
Non-Final Office Action from U.S. Appl. No. 13/946,986, dated Apr. 3, 2015.
Non-Final Office Action from U.S. Appl. No. 14/176,007, dated Apr. 7, 2015.
Kurtzig et al., U.S. Appl. No. 12/854,836, filed Aug. 11, 2010.
Non-Final Office Action from U.S. Appl. No. 12/854,836, dated Jul. 18, 2012.
Kurtzig et al., U.S. Appl. No. 12/854,849, filed Aug. 11, 2010.
Non-Final Office Action from U.S. Appl. No. 12/854,849, dated Jun. 26, 2012.
Kurtzig et al., U.S. Appl. No. 13/439,743, filed Apr. 4, 2012.
Non-Final Office Action from U.S. Appl. No. 13/439,743, dated Jun. 28, 2012.
Final Office Action from U.S. Appl. No. 13/439,743, dated Mar. 27, 2013.
Non-Final Office Action from U.S. Appl. No. 13/439,743, dated Dec. 5, 2012.
Non-Final Office Action from U.S. Appl. No. 12/854,846, dated Feb. 13, 2014.

(56) References Cited

OTHER PUBLICATIONS

Notice of Acceptance from AU Application No. 2010282516 dated Jan. 31, 2014.
Just Answer, Help, 2004-2005 Just Answer! pp. 1-10 https://web.archive.org/web/20050828022539/http://www.justanswer.com/help.asp#FAQ54.
Final Office Action from U.S. Appl. No. 13/464,269, dated Aug. 11, 2015.
Final Office Action from U.S. Appl. No. 13/464,287, dated Aug. 10, 2015.
Non-Final Office Action from U.S. Appl. No. 13/946,982, dated Jun. 29, 2015.
Sferra, "Customer Service Webpage" http://www.sferra.com/content1100/customer-service.html, Oct. 10, 2011, pp. 1-4.
Sears Brands LLC, "Customer Service Webpage" http://www.sears.com/shc/s/nb_10153_12605_NB_CSHome, Mar. 14, 2012, pp. 1-2.
Notice of Allowance from U.S. Appl. No. 13/946,989, dated Jul. 27, 2016.
Schonhofen, P., "Identifying document topics using the Wikipedia category network," Web Intelligence and Agent Systems: An International Journal 7.2, 2009, 8 pages.
Bischoff et al., "Can All Tags be Used for Search?" Proceedings of the 17th ACM conference on Information and knowledge management, ACM, 2008, pp. 203-212.
Anick et al., "The Paraphrase Search Assistant: Terminological Feedback for Iterative Information Seeking," Proceedings of the 22nd annual international ACM SIGIR conference on Research and development in information retrieval, ACM, 1999, pp. 153-161.
Non-Final Office Action from U.S. Appl. No. 13/946,984, dated Jun. 1, 2016.
Notice of Allowance from U.S. Appl. No. 13/464,287, dated Oct. 19, 2015.
Non-Final Office Action from U.S Appl. No. 13/946,989, dated Jan. 21, 2016.

\* cited by examiner

METHOD AND APPARATUS FOR IDENTIFIYING SIMILAR QUESTIONS IN A CONSULTATION SYSTEM

RELATED APPLICATIONS

The present application is related to U.S. patent application Ser. No. 12/854,838 filed on Aug. 11, 2010, U.S. patent application Ser. No. 12/854,836 filed on Aug. 11, 2010, U.S. patent application Ser. No. 12/854,849 filed on Aug. 11, 2010, and U.S. patent application Ser. No. 12/854,846 filed on Aug. 11, 2010, which are all incorporated herein by reference. The present application is also related to and incorporates by reference the below applications filed on the same day as the present invention, and entitled "Method and Apparatus for creation of web document titles optimized for search engines," "Method and apparatus for identifying and eliciting missing question details in a consultation system," "Method and apparatus for identifying customer service and duplicate questions in an online consultation system," and "Method and apparatus for identifying similar questions in a consultation system," by the same inventors, Gann Bierner and Edwin Cooper, and the application entitled "Method and apparatus for predicting question answerability in an online consultation system," by Gann Bierner as the inventor.

FIELD

The present application relates generally to the field of computer technology and, in specific exemplary embodiments, to methods and systems for automatically presenting to users questions similar to questions posted by users of a consultation system.

BACKGROUND

The Internet has become a great repository of information and everyday millions of people turn to the Internet seeking information on various topics of interest. However, with the ever increasing size of the Internet, finding reliable and accurate information on the Internet has become more difficult. An online consultation system allowing users to submit questions on specific topics, for a fee and receive answers tailored to their specific problem, from experts that have been confirmed to be knowledgeable in the particular topic, addresses this issue. For the expert users, the online consultation system provides a source of income, and a means to connect with and satisfy the needs of users that may otherwise not have any access to potential users in need of their service due to geographical or temporal distance. For the users, the online consultation system provides a source for reliable, customized and accurate information that is readily available to them at any time.

BRIEF DESCRIPTION OF DRAWINGS

The appended drawings are merely used to illustrate exemplary embodiments of the present invention and cannot be considered as limiting its scope.

DETAILED DESCRIPTION

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on quality control of experts, the embodiments are given merely for clarity and disclosure. Alternative embodiments may employ other systems and methods and are considered as being within the scope of the present invention.

Exemplary embodiments of the present invention provide systems and methods for identifying questions that are topically similar. In exemplary embodiments, once a question is submitted to an online consultation system, the systems and methods of the present invention can based on the content of a newly submitted question identify topically similar questions to the newly submitted question.

Alternative embodiments of the present invention further provide systems and methods for presenting topically similar questions to the online consultation system users who have just submitted their question.

In other embodiments of the present inventions, subscription users may be provided means of searching and identifying questions that are topically similar to the question they are seeking an answer to. By viewing the question and answer threads on the same or similar topics, the subscription users may find the answers they are looking for, or learn to better present their questions.

Figure 1:
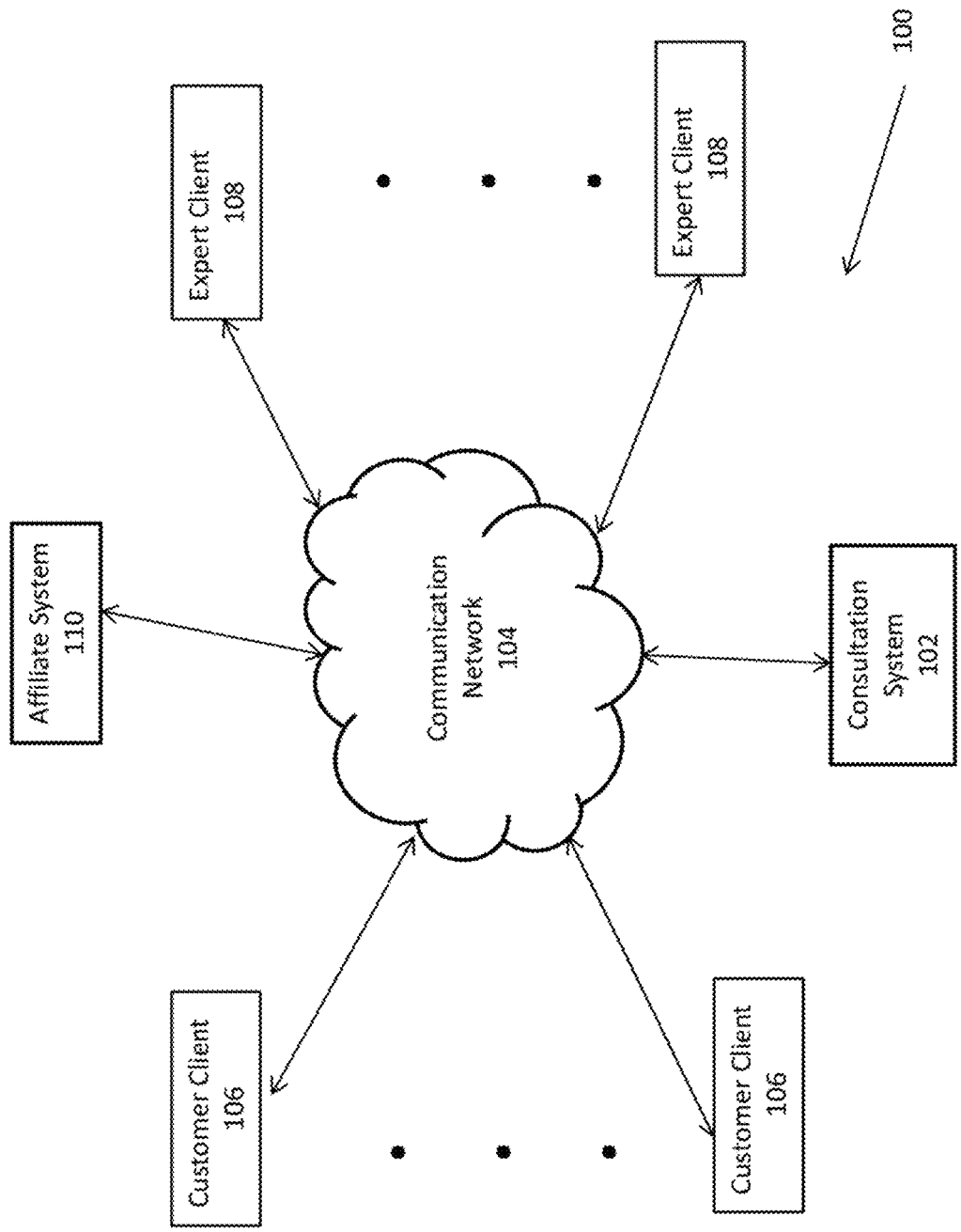
FIG. 1 is a diagram of an exemplary environment of an online consultation system in which embodiments of the present invention may be practiced.

FIG. 1 shows an exemplary environment 100 of an online consultation website and system in which embodiments of the present invention may be practiced. The exemplary environment 100 comprises a consultation system 102 coupled via a communications network 104 to one or more user 106 and expert user 108. The communication network 104 may comprise one or more local area networks or wide area networks such as, for example, the Internet and telephone systems.

In exemplary embodiments, the consultation system 102 provides a forum where users may post or pose questions for which experts may provide answers. The consultation system 102 may provide the forum via a website. In some embodiments, at least portions of the forum (e.g., asking of questions or receiving of responses) may occur via the website, mobile phone, other websites, text messaging, telephone, video, VoIP, or other computer software applications. Because the consultation system 102 is network based e.g., Internet, the users using the consultation system 102 and experts providing answers may be geographically or temporally dispersed (e.g., may be located anywhere in the world in different time zones). As a result an expert may provide answers to a user thousands of miles away. Additionally, the consultation system 102 allows a large number of users and experts to exchange information at the same time and at any time.

By using embodiments of the present invention, a user posting a question may easily obtain a tailored or customized answer. Accordingly, one or more of the methodologies discussed herein may obviate a need for additional searching for answers, which may have the technical effect of reducing computing resources used by one or more devices within the system. Examples of such computing resources include, without limitation, processor cycles, network traffic, memory usage, storage space, and power consumption. In addition, the system allows the users to access reliable, customized information responsive to their issue without excessive searching of the Internet.

In various embodiments, a user may pose a question and one or more experts may provide answers. In various embodiments, the question may be matched with a category of experts, more specific set of experts, or even individual experts, sometimes on a rotating basis by user selection, a keyword based algorithm, a quality based algorithm (or score or rating), or other sorting mechanism that may include considerations such as, for example, likely location or time zone. A back-and-forth communication can occur.

In exemplary embodiment of the present invention, in order to enhance the user experience and increase customer satisfaction, the users may be allowed to view previously submitted questions on similar topics as the question newly presented by the user.

The user may accept an answer provided by one or more of the experts users. In an alternative embodiment, the user may be deemed to have accepted the answer if the user does not reject it. By accepting the answer, the user validates the expert user's answer which, in turn, may boost a score or rating associated with the expert user. The user may also pay the expert user for any accepted answers and may add a bonus. The user may also leave positive, neutral or negative feedback regarding the expert user. More details regarding the consultation system 102 and its example functions will be discussed in connection with FIG. 2 below.

The exemplary user 106 is a device associated with a user accessing the consultation system 102 (e.g., via a website, telephone number, text message identifier, or other contact means associated with the consultation system 102). User 106, client, customer, customer client refers to a user of the consultation system 102. The user may comprise any individual who has a question or is interested in finding answers to previously asked questions. The user 106 comprises a computing device (e.g., laptop, PDA, cellular phone) which has communication network access ability. For example, the user 106 may be a desktop computer initiating a browser for access to information on the communication network 104. The user 106 may also be associated with other devices for communication such as a telephone.

In exemplary embodiments, the expert user 108 is a device associated with an expert. The expert user, by definition, may be any person that has, or entity whose members have, knowledge and appropriate qualifications relating to a particular subject matter. Some examples of expert subject matters include health (e.g., dental), medical (e.g., eye or pediatrics), legal (e.g., employment, intellectual property, or personal injury law), car, tax, computer, electronics, parenting, relationships, and so forth. Almost any subject matter that may be of interest to a user for which an expert user has knowledge and appropriate qualifications may be contemplated. The expert user may, but does not necessarily need to, have a license, certification or degree in a particular subject matter. For example, a car expert user may have practical experience working the past 20 years at a car repair shop. In some embodiments, the expert user may be a user (e.g., the expert user posts a question).

The expert user 108 may comprise a computing device (e.g., laptop, PDA, cellular phone) which has communication network access ability. For example, the expert user 108 may be a desktop computer initiating a browser to exchange information via the communication network 104 with the consultation system 102. The expert user 108 may also be associated with other devices for communication such as a telephone.

In accordance with one embodiment, an affiliate system 110 may be provided in the exemplary environment 100. The affiliate system 110 may comprise an affiliate website or other portal which may include some of the components of the consultation system 102 or direct their users to the consultation system 102. For example, the affiliate system 110 may provide a website for a car group. A link or question box may be provided on the affiliate website to allow members of the car group to ask questions. The environment 100 of FIG. 1 is exemplary. Alternative embodiments may comprise any number of consultation systems 102, user 106, expert user 108, and affiliate systems 110 coupled together via any type of one or more communication networks 104, and still be within the scope of exemplary embodiments of the present invention. For example, while only one consultation system 102 is shown in the environment 100, alternative embodiments may comprise more than one consultation system 102. For instance, the consultation systems 102 may be regionally established.

Figure 2:
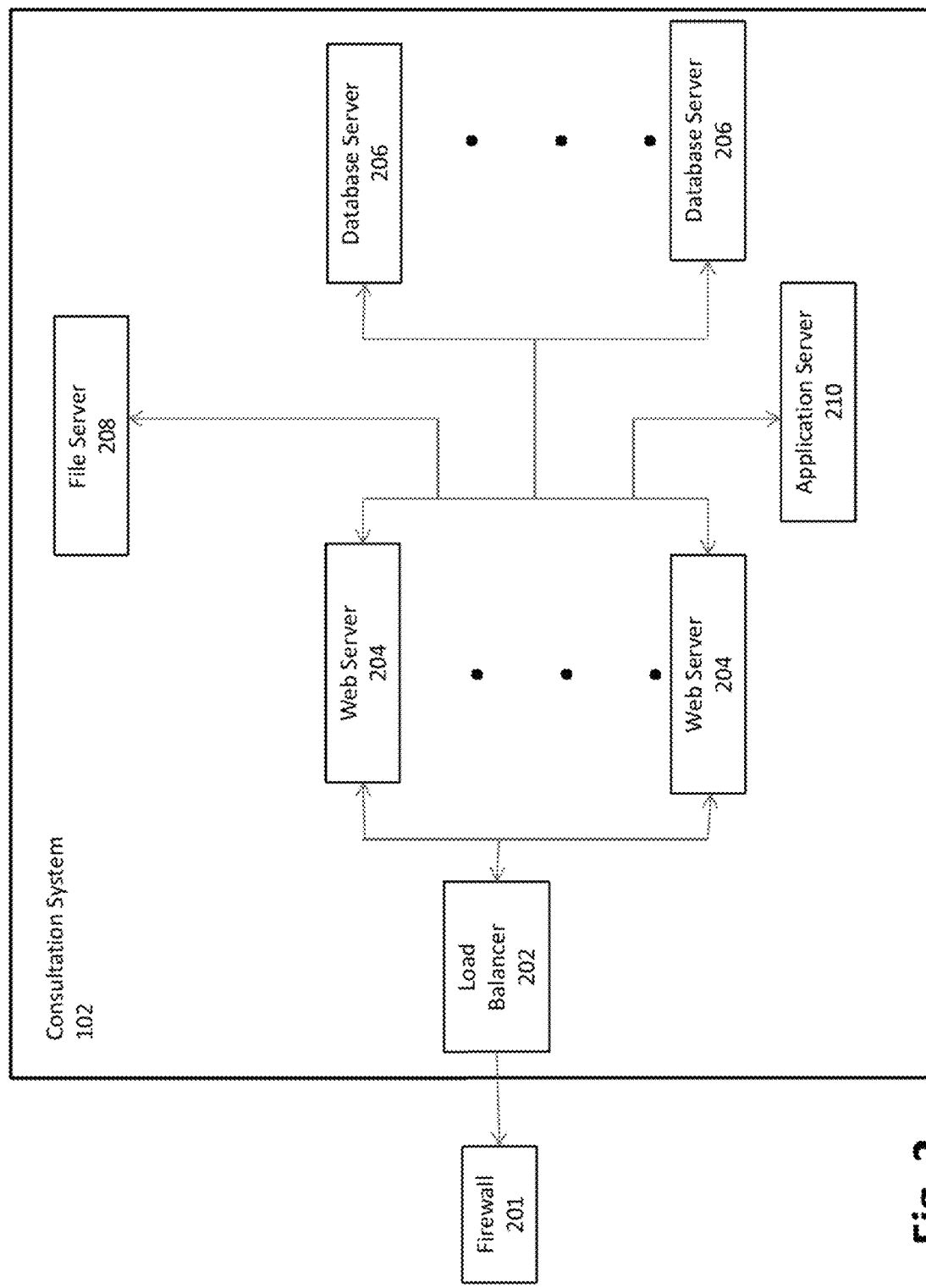
FIG. 2 is a block diagram of an exemplary consultation system.

Referring now to FIG. 2, the consultation system 102 is shown in more detail. In exemplary embodiments, the consultation system 102 may comprise a load balancer 202 which distributes work between two or more web servers 204 in order to optimize resource utilization and minimize response time. In some embodiments, a firewall 201 may be provided prior to the load balancer 202.

In exemplary embodiments, the web servers 204 are responsible for accepting communications from the user 106 (e.g., request or question) and expert user 108 (e.g., response) and serving the response including data content. In some instances, the request and response may be in HTTP or HTTPS which will result in HTML documents and linked objects (e.g., images) being provided to the user and expert users 106 and 108. The communications may include, for example, questions from the users, answers from the experts, acceptance from the user, payment information, account update information, videos, documents, photographs and voice. The web server 204 will be discussed in more detail in connection with FIG. 3.

Information used by the web server 204 to generate responses may be obtained from one or more database servers 206 and a file server 208. The exemplary database servers 206 store data or are coupled with data repositories storing data used by the consultation system 102. Examples of data include user information (e.g., username, address, credit card or other payment information), expert information (e.g., name, licenses, certifications, education and work history), previously asked questions and corresponding answers, and transaction information (e.g., payment, accepts, etc.). Essentially any data may be stored in, or accessed by, the database servers 206 including every user and expert interaction with the consultation system 102. Examples of interactions include how many questions the user has asked, which experts provided answers to the questions, and whether the user accepted the answers and paid the expert.

Content on the database servers 206 (or accessed by the database servers 206) may be organized into tables, and the tables may be linked together. For example, there may be one table for every question that has been previously asked, another table for posts (e.g., answers) to each question, and other tables for users and experts. In one example of the present invention, over 430 tables or spreadsheets are linked together.

In some embodiments, the database servers 206 may include logic to access the data stored in the tables. The logic may comprise a plurality of queries (e.g., thousands of queries) that are pre-written to access the data.

It should be noted that the functions of the database server 206 may be embodied within the web server 204. For example, the database servers 206 may be replaced by database storage devices or repositories located at the web servers 204. Therefore, any reference to the database server 206 and database storage device are interchangeable. Alternatively, some or all of the query logic may be embodied within the web server 204.

In exemplary embodiments, a plurality of database servers 206 is provided. The plurality of database servers 206 may share data and thus be identical (or close to being identical). By having identical database servers 206, load balancing and database backup may be provided.

The file server 208 stores or accesses files such as, for example, pictures, videos, voice files, PDF documents, Word documents, and PowerPoint presentations. When a particular file is requested or required in order to generate a response, the web server 204 may query the file server 208 for the file. Alternatively, the files may be stored at the database server 206 or other database storage devices, for example.

An application server 210 may also be provided in the consultation system 102. The application server 210 may provide applications and functions that are centralized to the consultation system 102. For example, the application server 210 may perform credit card processing with a bank that is coupled to the consultation system 102 via a network (e.g., the communication network 104).

It should be appreciated that in alternative embodiments, the consultation system 102 may include fewer or more components than shown in FIG. 2. For example, the consultation system 102 may comprise any number of web servers 204, database servers 206, file server 208, and application server 210. In another example, the file server 208 and application server 210 may be removed from the consultation system 102 and their functions performed by other servers in the consultation system 102. It will also be appreciated that the various servers may be embodied within each other and/or the consultation system 102 may be embodied within a single server. For example, the database server 206 may be embodied, as a storage device within the web server 204. It is also noted that the various servers of the consultation system 102 may be geographically dispersed within the exemplary environment 100.

Figure 3:
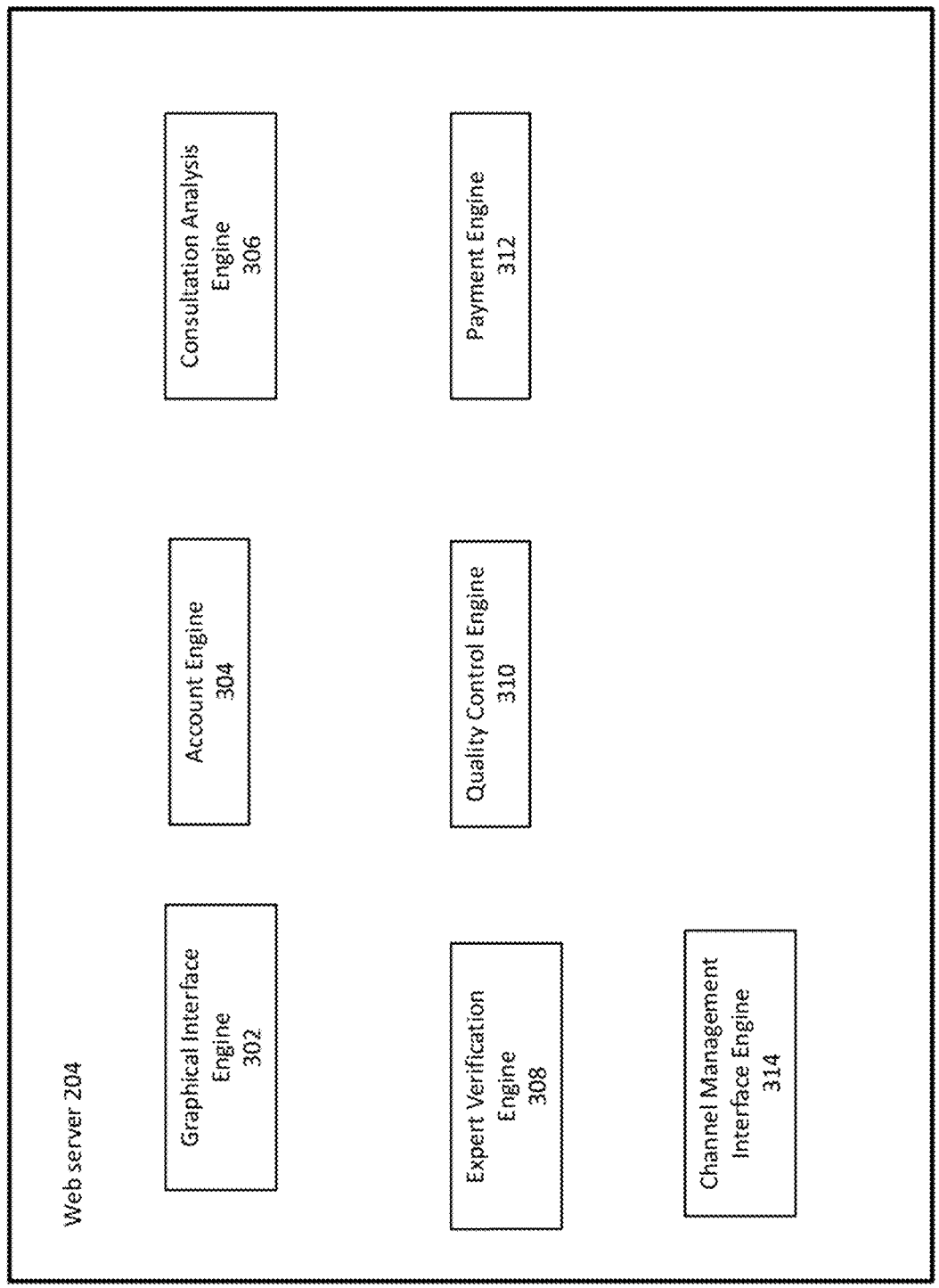
FIG. 3 is a block diagram of an exemplary web server.

Referring now to FIG. 3, one of the exemplary web servers 204 is shown in more detail. As discussed, the web servers 204 share in the workload in order to provide optimized performance. As such, each of the web servers 204 will include similar engines and modules. In the exemplary embodiment of FIG. 3, the web server 204 comprises a graphical interface engine 302, an accounts engine 304, a consultation analysis engine 306, an expert verification engine 308, a quality control engine 310, a payment engine 312, and a channel management engine 314 communicatively coupled together.

The exemplary graphical interface engine 302 generates graphical representations provided via the web page. In exemplary embodiments, the graphical interface engine 302 builds a page (e.g., made up of HTML, Javascript, CSS, sound, video, images, and other multimedia) that is presented to the user 106 or expert user 108. The page comprises static text (e.g., "Welcome to JustAnswer.") and dynamic data (e.g., "Hello, hulagirl. You joined 3 months ago; have asked 17 questions; have accepted 12 answers."). The dynamic data may be obtained, at least in part, from the database servers 206. In exemplary embodiments, the dynamic data may be retrieved using querying logic associated with the web server 204, the database server 206, or a combination of both, as discussed above.

The exemplary accounts engine 304 sets up, and maintains user accounts with the consultation system 102. Initially, the accounts engine 304 may provide a registration page via the graphical interface engine 302 for an individual (e.g., a user or expert) to fill out. The information collected via the registration page may be stored in the database server 206. Examples of information include user name, e-mail address, and billing and payment information. With respect to experts, the accounts engine may also collect information regarding the identity of the expert, information on credentials (e.g., license and certification numbers, degrees including university attended and years of attendance, employment history), and other data relating to the expert and the expert's application. Accounts for users may be automatically established and activated based on certain actions taken by the user, such as asking a question, agreeing to the terms of the consultation system, or providing payment. However, experts, in accordance with exemplary embodiments, proceed through an acceptance and verification process. If accepted, an expert account may then be established and activated by the accounts engine 304. The verification process will be discussed in more detail below.

The consultation analysis engine 306 manages answers in response to questions which have been posted to the consultation system 102. In exemplary embodiments, the consultation analysis engine 306 will receive questions along with indications of a category or subject matter each question is directed to from users. In various embodiments, a user may utilize a question page to enter a question which the user wants an expert to answer. As further described below, in many cases a user may initially find the consultation website after having first having entered a query in a search engine. Having found the online consultation site, the user may enter its question in the field for entering the question, including providing relevant information relating to the question (e.g. make and model of a car), as well as a selection box for selecting a subject matter expert under which the question should be posted to. In exemplary embodiments, other pages may be presented to the user before or after the question is submitted to experts, to obtain further data from or provide data to the user. In alternative embodiments, a "question details" page may be presented to users to solicit important information that could help the expert formulate a better answer to the user's question (e.g. make and model of a car in the car category, breed and age of a pet in the veterinary category, etc.). The question is also recorded into a corresponding table in the database server 206 (e.g., in a question table) and the user name of the user may also be entered into a corresponding table (e.g., user table). In some instances, the question may be outputted back to the user so that the user may confirm the question or edit the question if needed.

The user may also provide an amount that the user is willing to pay for an accepted answer, in some embodiments, as an amount selected by the user from different options offered to the user.

Once the question is posted on the consultation system 102, experts may provide answers in response to the question. The questions may be posted to a general or subject matter specific question list of recent questions that have been posted by users, a more specific group of experts, or certain experts one-at-a-tune. In various embodiments, the question list may be sorted by certain types of information such as time of posting, the amount the user is willing to pay (e.g., value), the user's history of accepting previous answers, information regarding the subject matter of the question, or whether replies have been previously posted. Experts may periodically review the question list or other communications alerting them to questions to determine if there are any questions that the expert would like to answer. The expert may base their determination, in part, on the complexity of the question, their expertise, the amount the user is willing to pay for an answer, or the user's history of accepting previous answer, and whether the question is complete or missing details. In various embodiments, the user is able to place a deposit and name a price for an answer when posting the question or place the deposit after an expert has answered.

Should the expert decide to answer a question or request further information, an indication is provided to the user that there is an answer being offered or a request for further information, sometimes in the form of the answer or the request itself. The indication may also comprise an e-mail, text message, or pop-up notification to the user. In some cases, the user may place a deposit (e.g., the amount agreed upon to be paid if an answer is accepted) after being given the opportunity to view a profile of the expert offering the answer or a portion of the answer.

The answer is provided to the user. The answer may be displayed on a web page (e.g., an answer page), provided via a chat session, provided via a voice or text message, provided via video, provided by a software application, provided by other social media means (e.g., social networking sites where the user has a personal profile or page), or provided by telephone, mobile phone, or VoIP. Upon review of answers posted in response to a question, the user decides if any of the answers are acceptable to the user. The user may accept one or more answers that are posted. In exemplary embodiments, the user will pay the expert posting any accepted answers. If a particular answer is exceptional, in exemplary embodiments, the user may also provide a bonus to the expert providing the exceptional answer. When the user accepts an answer, monies from the deposits may also be paid to a host of the question and answers platform (e.g., host of the consultation system 102).

In various embodiments, different pricing options may be used for determining what a user may pay for getting an answer to a question or what an expert may be paid for providing an answer. In one embodiment, the pricing options may vary for each category or subcategory based on a variety of factors. These factors may include, for example, question length, time of day, day of week, location, or the ability of a user to pay. Additionally, discounts may be offered (e.g., two for one, ask one question get second for 50% off, free for pro bono users). In other embodiments, pricing may be selected and paid for by third-parties (e.g. employers of the users). In yet other embodiments, a user may subscribe to a subscription plan (e.g., unlimited questions each month for a particular fee or up to 10 questions each month for another fee). In other embodiments, a user or expert may be allowed to adjust the price prior to, during, or after the interaction between the user and the expert.

Acceptance and non-acceptance actions are tracked by the consultation analysis engine 306. For example, every user's accept-to-question ratio may be tracked and may be published to experts. Thus, if the ratio is low, experts may not answer the user's questions in the future. Furthermore, the user's question posting privileges may be suspended or the user may be removed from the consultation system 102 if the ratio is low or falls below a ratio threshold. The tracked acceptance and non-acceptance information is stored to the database server 206, and may be used to evaluate the quality of the experts as is discussed herein.

The user may also provide comments and feedback after viewing or accepting one or more answers. The feedback may be provided as, for example, a written comment, star rating, numerical scale rating, or any other form of rating. The feedback is stored to the database server 206, and may be used in the quality control processing. User satisfaction surveys may also be sent to collect data on the user's experience with the site, the expert, or the answer the user received.

According to some embodiments, if a user submitted question has been previously answered, a query of the database server 206 may be performed. The answers to previously asked questions may be stored in corresponding answer tables in the database server 206. These embodiments may occur when, for example, a user searches (e.g., using Google) for previous questions and answers. Multiple instances of access to the same questions and/or answers may be provided via a cache. Some or all users may also be allowed to search some or all previous questions or answers via a search tool on the website, or some or all previous questions or answers may be displayed to users at the discretion of the host, affiliate, or expert of the consultation system.

In various embodiments, the users may be directed to a "wait room" page, where they may be presented with previously asked and answered questions on the same topic as the question the user just submitted. In alternative embodiments, the user may be allowed to search or other questions asked on similar topics. In yet other embodiments, the user may be a subscription plan member and as part of his membership, he may have access to searching the question archive for questions posted on similar topics. In each of these examples, the ability of the consultation system 102 to automatically identify and present previously submitted questions that address the same or similar topics as the newly submitted user question would enhance the user experience.

The exemplary expert verification engine 308 performs verification and acceptance of experts. In accordance with exemplary embodiments, the expert verification engine 308 verifies information provided by the potential experts (or experts) or receives verification data used to verify the experts' identities or credentials. The verification may occur prior to allowing the expert to join the consultation system 102. Alternatively, the verification may occur any time after the expert has joined the consultation system 102. More than one verification may be performed for each expert, by requirement or by the expert's choice.

In exemplary embodiments, the quality control engine 310 evaluates experts in order to promote the high quality of experts in the consultation system 102. The evaluation may comprise scoring or ranking experts based on various elements. For example, the quality control engine 310 may access and review feedback associated with each expert, and score each expert accordingly. The quality control engine 310 may also review other factors which may increase or decrease an expert's score or ranking. The exemplary payment engine 312 manages pricing options and the payment of fees. In accordance with exemplary embodiments, users pay experts for accepted answers to their questions, for example, by way of payments per questions, payments per answers, payments per time frame, or payments on a subscription basis. In some instances, the user may provide a deposit in order to view answers prior to accepting the answers. The payment engine 312 may maintain a record of all these transactions. Additionally, the payment engine 312 may work with the application server 210, if provided, to process payments (e.g., credit card processing, PayPal processing).

The exemplary channel management engine 314 manages the creation of new channels in the consultation system 102. A new channel may comprise a new category or a new affiliate relationship on the consultation system 102. In some embodiments, the new category may be placed on a test site of the consultation system 102. However, questions may be posted to a main site of the consultation system 102 so that experts on the main site may also provide responses to the questions. Should the new category prove to be successful, the new category may then be moved to a main site of the consultation system 102. The new affiliate relationship results in the affiliate system 110 being linked to the consultation system 102.

Figure 4:
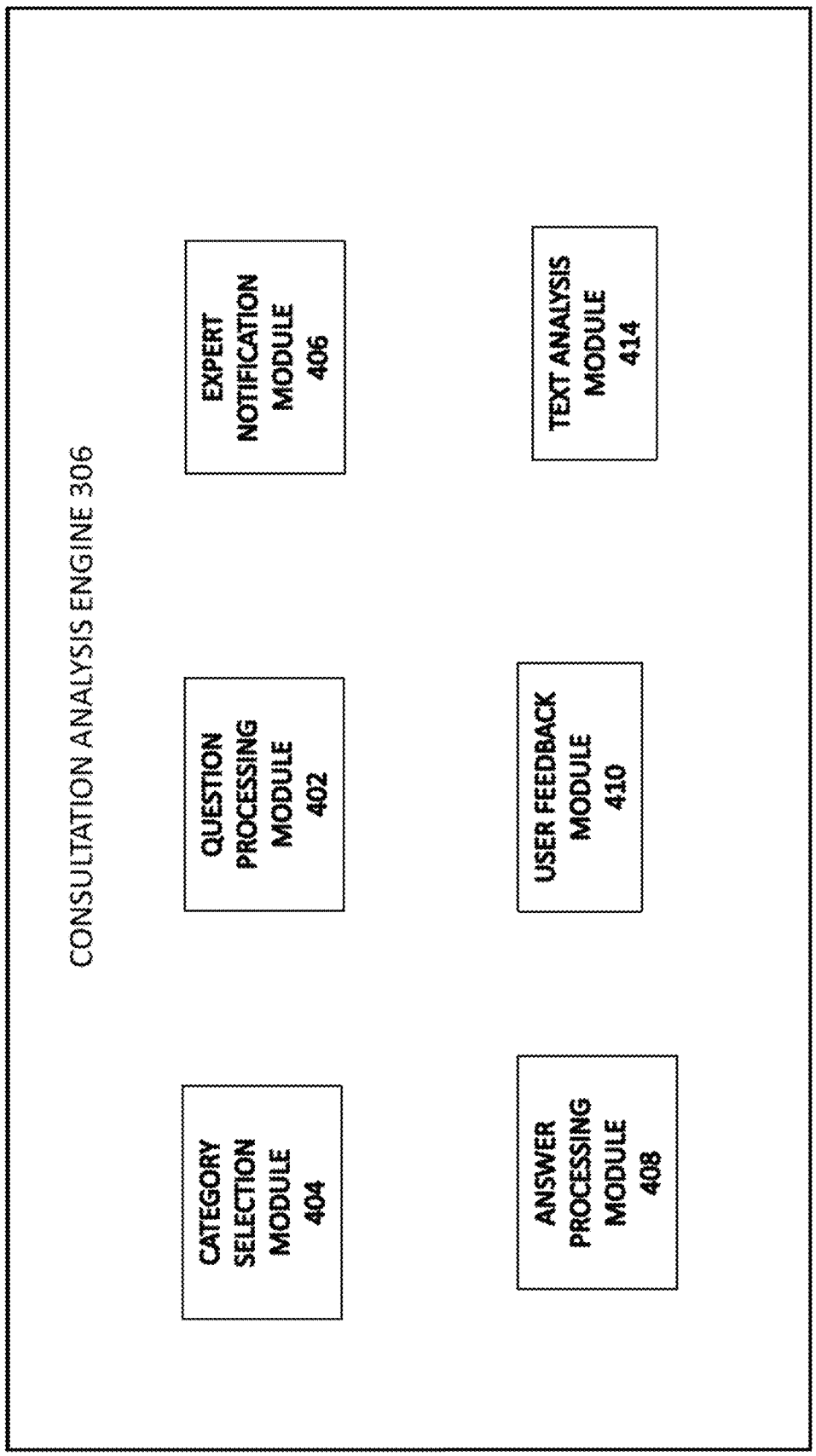
FIG. 4 is a block diagram of an exemplary consultation analysis engine.

FIG. 4 is a block diagram of the consultation analysis engine 306. The consultation analysis engine 306 manages the questions and answers exchange between the users and experts through the online consultation system 102, as well as other users and experts interactions such as processing experts' answers or managing user feedback of expert answers. In exemplary embodiments, the consultation analysis engine 306 comprises a category question processing module 402, a category selection module 404, an expert notification module 406, an answer processing module 408, a user feedback module 410, and text analysis module 414, communicatively coupled together. It is noted that some of the modules of the consultation analysis engine 306 may be embodied in other components of the consultation system 102. For example, the text analysis module 414 may be embodied in the 306. Alternatively, the topic extraction module 414 and the answer processing module 408 may be both embodied in the question processing module 402.

The question processing module 402 receives questions submitted by users to the consultation system 102. As previously discussed, users may arrive at the consultation system 102's website directly or indirectly. Users may reach the initial landing page through one of many affiliate websites. In most cases, regardless of how the user arrives at the online consultation system 102, the basic elements of the landing page may be similar, including a question box where the user may input and submit his or her question, as well as subsequent pages where the user can supplement the question with additional details.

The input to the question processing module 402 includes any metadata associated with the question such the subject category of the question, the tune the question was delivered, etc. The question processing module may include additional features for analyzing and incorporating any details submitted through the "question details" page. In addition, the question processing module may filter the submitted question of any personal information such as phone numbers or address to protect the user's privacy.

The category selection module 404 operates to assign the question to an appropriate category. The appropriate category includes experts that have the expertise to answer the user's question. In one embodiment of the present invention, the category selection module may process the user's selection of a category to assign the question to that category. In alternative embodiments, an automated text analysis module such as the text analysis module 414 may process the question body and automatically assign a category the submitted question. In yet another embodiment, the category selection module may assign the question based on the affiliate channel through which the user is posting the question. For example, if an affiliate site is related to cars, questions generated from that affiliate website may be automatically directed to the car category.

The expert selection module 406 presents the posted user question to the right expert or group of experts. In one embodiment of the present invention, the expert selection may be based on input from the user. In an alternative embodiment, the expert selection is based on the question category. So, if a particular expert was not selected by the user, the expert selection module may present the question to all qualified expert within a given category.

In an exemplary embodiment of the present invention, an answer processing module 408 may process expert responses to posted questions, in the same manner the question processing module 402 processes user questions. In an alternative embodiment, the answers may be processed by the question processing module 402. In some exemplary embodiments of the present invention, the answer processing module 408 may send a notification to the user informing the user that his or her submitted question has been accepted by an expert or alternatively have been answered by an expert. The user may have to log back into the consultation system 102 to view and accept the posted answer and ask follow up questions if any.

In one exemplary embodiment of the present invention, a text analysis module 414 may be an independent module of the consultation analysis Engine 314. In an alternative embodiment, the text analysis module 414 may be embodied in the question processing module 402. In another embodiment, the text analysis module 414 may be embodied as part of the answer processing module 410. In yet another embodiment the text analysis module 414 may be incorporated in the channel management engine 306.

In various embodiments of the present invention, described in general terms, the text analysis module 414 receives as input texts from questions or answers, and applies various linguistic and/or statistical models to the text to process the content of the text input. A feature extraction component of the text analysis module 414 uses the processed text input along with a desired set of rules to extracts relevant features. So, the text analysis module 414 produces a desirable outcome (extracted features) based on the text input. In some implementation of the text analysis module 414, the given model may be perfected by allowing an iterative training process to tweak and optimize the model. Additionally, in alternative embodiments, various smoothing operations may be performed to for example change extracted feature weights or drop non relevant features all together.

Furthermore, the text analysis module 414 has the ability to recognize and output topics and its variants. Thus, text analysis is not limited to a single, word or phrase but includes variations on such identified word or phrase. For example, the identified topic "Yorkie," may also represent variants such as "Yorkshire terrier," or the word "sewing" may include "sewing machine."

In the present invention, the text analysis module 414 is used to automatically extract topics relevant to a set of asked questions. The input to the text analysis module 414 as applied to automated identification and presentation of similar topic questions is a set of answered questions and their related metadata. The text analysis module 414 operates to identify topics common to newly submitted questions and previously submitted and answered questions. Once topics common to the questions are identified, the questions on similar topics may be presented to the user who posted the newly submitted question. In an alternative embodiment, the result of the analysis from the text analysis module 414 may be used to identify and present similar topic questions in response to a search engine query, or a search of the online consultation system's 102 database for question and answer threads. The text analysis module 414 is further described in FIG. 5 below.

Figure 5:
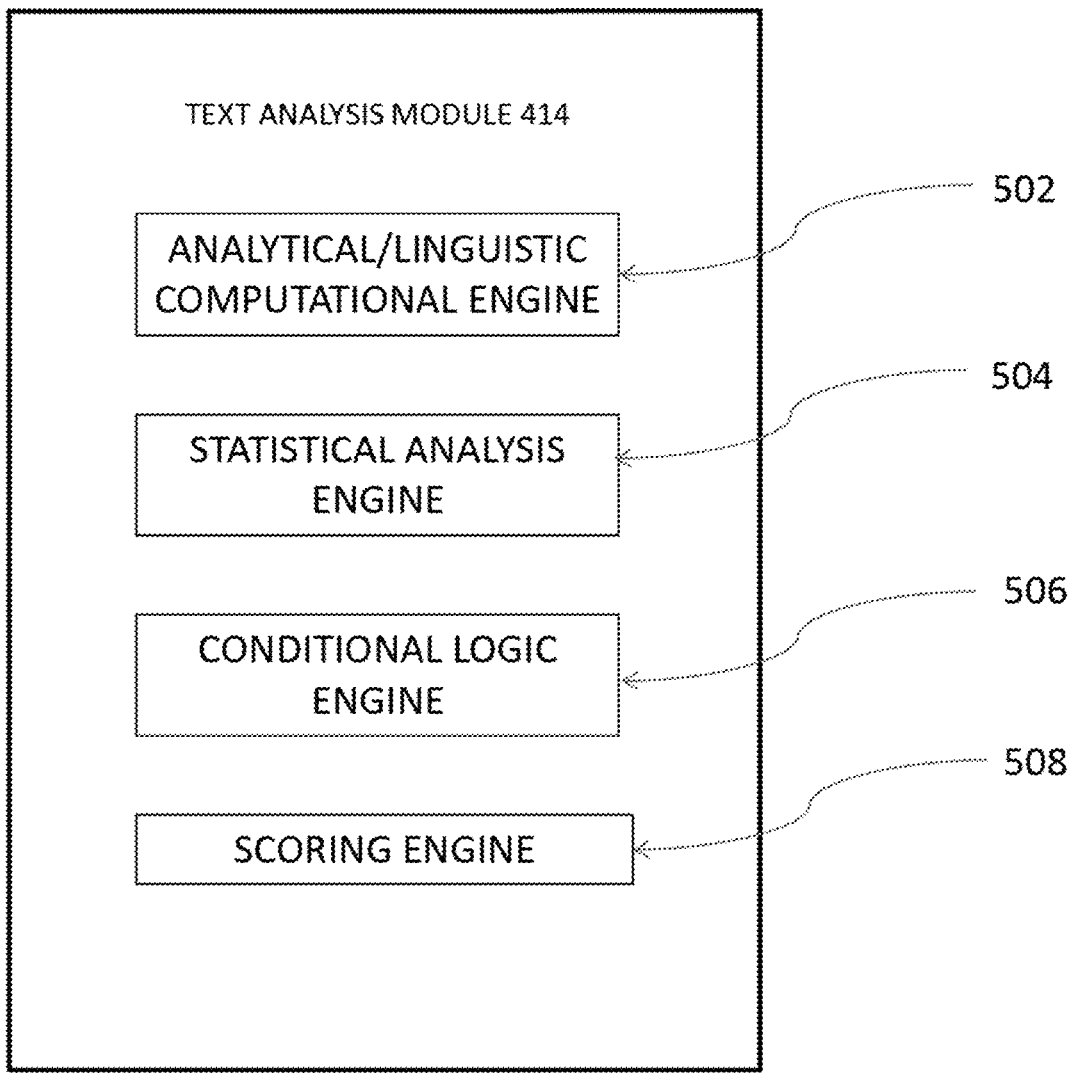
FIG. 5 is an exemplary block diagram of the text analysis module as applied to presenting topic based similar questions.

FIG. 5 is an exemplary block diagram of the text analysis module as applied to identifying similar questions. In the online consultation system 102, once a user submits her question, the user may be directed to a waiting room while waiting for an answer to her question. Alternatively, a subscription user may be allowed to access the question and answer database as a feature of her subscription. Alternatively, Internet users searching for answers to their questions may generate search engine queries that would access the online consultation's 102 question and answer database. In all of these examples, it may be desirable to present questions and answers previously submitted on similar topics. One solution to identifying similar questions may be based on the identification of a single topic that is found to be similar or common. However, in the case of questions submitted to an online consultation system 102, the questions cover a great many topics. Additionally, each question may include multiple topics and figuring out the most important topics to base the similarities on is a difficult problem. For example, the question "I am a 52 years old male, generally in good health, somewhat active, smoker (½ day pack) 2 weeks ago my hands and fingers became numb with a tingling sensation all the time. No injury or pain, feels like they "went to sleep" but is constant, what could it be?"

The most important terms in this question may be hands, fingers, numb, and tingling sensation. The other terms, such as health, pack, and male are potentially useful secondary information but if applied on equal footing with the most important terms, it may make identification of the most similar questions difficult because it would render the criteria for similarity too broad. There are discourse techniques that have attempted to address this problem. However, actual implementation of such techniques is generally difficult to apply. Embodiments of the present invention address this issue in a different manner.

FIG. 5 shows an exemplary text analysis module as applied to automated topic extraction in more detail. The exemplary text analysis module 414 may include a computational linguistic engine 502, and a scoring engine 508.

In an exemplary embodiment of the present invention, the analytical/linguistic computational engine 502 performs computational linguistics to extract relevant topics. This engine breaks down a sentence into component parts of various levels of abstraction: words, phrases, parts of speech (e.g. noun, adjective, etc.), concepts, etc. A phrase may comprise of several words included together. In exemplary embodiments, words and phrases corresponding to various topics contained in the question under analysis are identified. Word segmentation (identifying a sentence's component words) can be performed both algorithmically and statistically. In one exemplary embodiment of the present invention, a statistical modeling approach may be used to improve accuracy of the word segmentation. Likewise, phrases can be determined both algorithmically and statistically, and in some exemplary embodiment a blended algorithmic/statistical approach may be used.

The scoring engine 508 may be used to score the candidate topics. In this case, a modified version of Term Frequency, Inverse Document Frequency (TFIDF) may be used. TFID is a well-known scoring formula used commonly in information retrieval. TFIDF scoring is most commonly used in the context of document retrieval. When scoring a word or phrase for a given document, the standard TFIDF score is increased for every occurrence in the document (Term Frequency) and decreased for every document that contains it (Inverse Document Frequency). This favors documents about the term or phrase, but not as much if the term or phrase is seen in a lot of places, and therefore probably not very specific. In the exemplary embodiment of the present invention, at the time of the question submission, the user may select a category relevant to the question. Alternatively, an automated question categorizer may assign a category to the question based on topics the question contains. The question category may be presented as part of the question metadata. Once the user submits his or her question, the newly submitted question along with its metadata is retrieved and the scoring engine applies various scoring techniques to its content. The scoring engine 506 may uses a first modified TFIDF methodology that values terms that occur frequently in the question's category but relatively infrequently overall. This scoring system is good for obtaining a list of candidate topics extracted from the newly submitted question. However, this first modified TFIDF methodology does not identify which of the terms are the most important for finding similar questions. In the case of the previous illustrative example, since the question is associated with the medical or health category, terms such tingling sensation, smoker (½ pack a day) and numb are identified.

In order to identify among the candidate topics the key similar topics, a second modified TFIDF method may be used that values terms that appear frequently in the question but infrequently in the category. This method gives more weight to topics/terms that are unique to the question and special in the category. Using the previous example question as an illustrative example, the second TFIDF method results in the identification of the terms hands, tingling sensation, etc.

Figure 6:
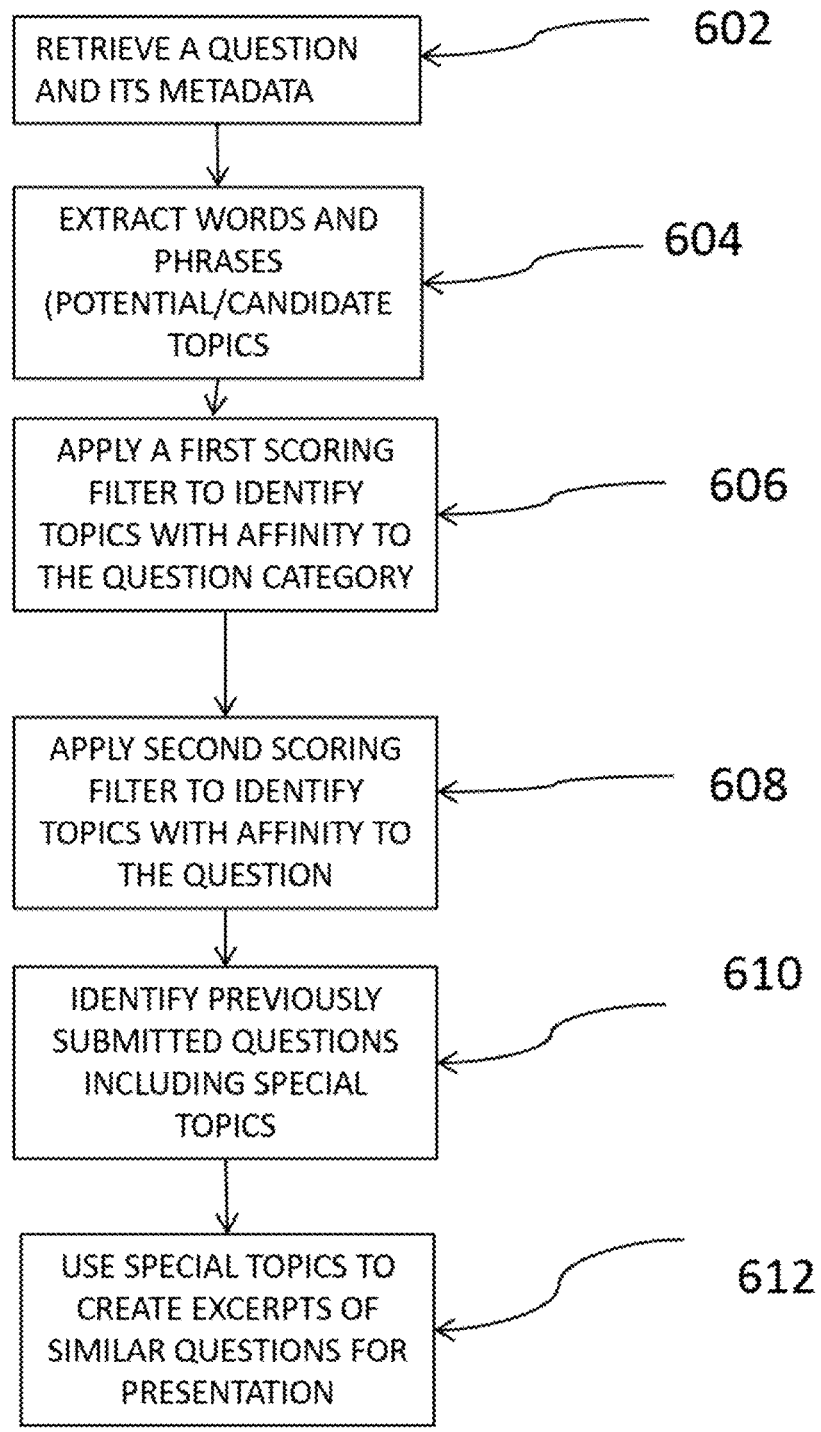
FIG. 6 shows an exemplary flowchart of a method of presenting topic based similar questions.

FIG. 6 shows an exemplary flowchart of a method for identifying similar topic questions. Referring now to FIG. 6, in operation 602, a newly submitted user question is retrieved along with its corresponding metadata. In operation 604, phrasal analysis is conducted on the question to extract words and phrases that correspond to candidate topics within the newly submitted question. In alternative embodiments of the present invention, the linguistic engine

502 may perform some or all of the following tasks: sentence detection, tokenization, phrase extraction, tagging of speech parts. The linguistic engine 502 receives as input a given text, in this case the question posted by a user, and the linguistic engine identifies the sentence components comprising the text. For example, the linguistic engine 502 may tokenize the sentence components and breaks down the question into component parts of various levels of abstraction: words, phrases, parts of speech (e.g. noun, adjective, etc.), concepts, etc. Below is the example of a user submitted question:

"My son was emancipated last December. Now is thinking about moving back with his mom. He will be 20 years old in January and makes about $800 a month. Will I have to pay child support again? We live in Indiana."

The text analysis will parse out the question into linguistic components and pull out candidate topics from the question body.

In operation 606, candidate topics are identified by applying a modified TFIDF filter that favors topics that occur in the newly submitted question category but less often overall. This step eliminates the more common words and phrases and reduces noisy and irrelevant words and phrases. The output below shows a sorted list of the candidate topics identified in the previous operation. The output of the candidate topics is sorted by the candidate topics TFIDF scores with filter parameters that favor topics occurring more often in the question category.

Candidate Topics:
   live (0.10725347753866696)
   son (0.09961555480412995)
   month (0.07746284049750854)
   January (0.0518139135296688486)
   mom (0.0440113319447661575)
   20 years (0.02580057634329287)
   pay child support (0.024156511440147542)
   indiana (0.0155470973328261048)
   moving back (0.004173515163288225)
   emancipated (0.0039200957669021211)
   last december (0.0028531542365783083)

In operation 608, a second modified TFIDF filter is applied to the candidate topics wherein the filter parameters favor topics that appear frequently in the question and infrequently in the category. This step identifies the "special terms" or "similar topics" which can be used to identify questions on similar topics. The candidate topic list below is created as a result of applying a second TFIDF filter to the previously identified candidate topics. The second filter's parameters are adjusted to give preference to candidate topics with higher affinity to the question and less affinity to the category. As seen from the example below, the second filter re-ranks the candidate topics and very significant topics such as "emancipated" and "Indiana" bubble up to find a more prominent ranking on the list. This is based on sorting the candidate topics with a new filter based on their new TFIDF scores.

Restored Topics:
   last december (0.30215665097456007)
   emancipated (0.2922365795107056)
   moving back (0.28541500215450144)
   indiana (0.2315465529274823)
   pay child support (0.21635069036199916)
   20 years (0.20412321928485042)
   mom (0.17874704549526324)
   January (0.16930135284462303)
   son (0.12852465419226258)
   month (0.12815286882663196)
   live (0.11789014016759114)

In operation 610, the "special terms" or "similar topics" are used to identify within the database of previously submitted questions containing the "similar topics." In operation 612, for each previously submitted question, the identified similar topics contained therein are used to create excerpts of the question, and the question excerpts are presented to the user who submitted the new question. In alternative embodiments of the present invention, the creation of relevant excerpts based on the similar topics may be performed using systems and methods similar to those described in the related patent application entitled "Method and Apparatus for automatic web document title creation for search engine optimization in a consultation system," by the same inventor, filed on the same day as the present invention and herein incorporated in its entirety this application.

In alternative embodiments of the present invention, similar questions are presented to a user who is accessing the online consultation system 102 through a commercial search engine. In yet another embodiment, the user has a subscription level access to the online consultation system 102 where the user is given access to the database of previously submitted question and answer threads, and the user can create his or her search query searching through the online consultation system's 102 search engine.

Figure 7:
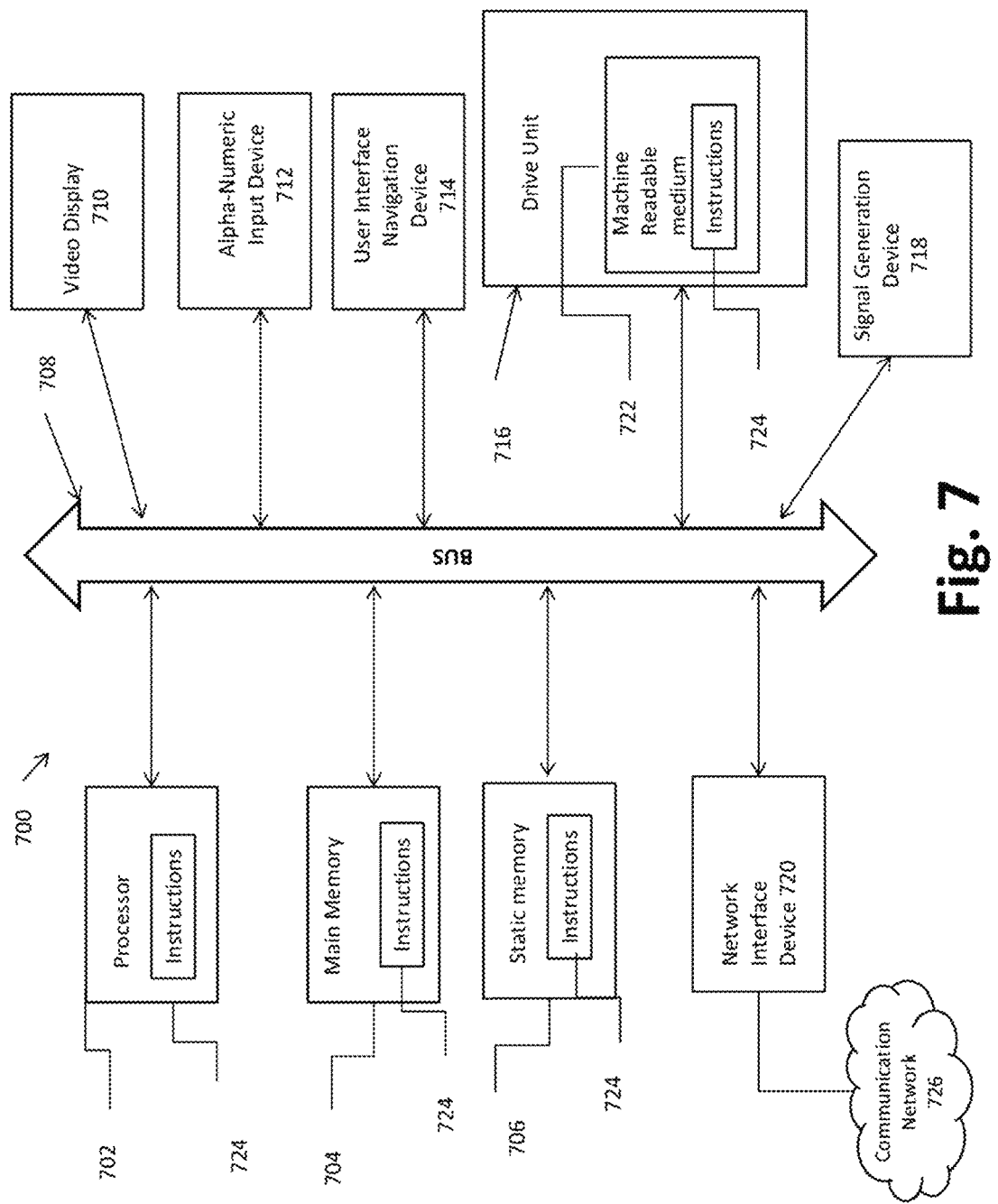
FIG. 7 shows a simplified block diagram of a digital device within which a set of instructions, for causing the machine to perform any one or more of the methodologies discussed herein, may be executed.

FIG. 7 shows a simplified block diagram of a digital device within which a set of instructions, for causing the machine to perform any one or more of the methodologies discussed herein, may be executed.

Modules, Components, and Logic

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, user, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry or in temporarily configured circuitry (e.g., configured by software) may be driven by, for example, cost, time, energy-usage, and package size considerations.

Accordingly, the term module or engine should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Exemplary Machine Architecture and Machine-Readable Medium

With reference to FIG. 7, an exemplary embodiment extends to a machine in the exemplary form of a computer system 700 within which instructions for causing the machine to perform any one or more of the methodologies discussed herein may be executed. In exemplary embodiments, the computer system 700 may be any one or more of the user 106, the expert user 108, affiliate system 110, and servers of the consultation system 102. In alternative exemplary embodiments, the machine operates as a standalone device or may be connected (e.g., networked) to other machines. In a networked deployment, the machine may operate in the capacity of a server or a user machine in server-user network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 may include a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). In exemplary embodiments, the computer system 700 also includes one or more of an alpha-numeric input device 712 (e.g., a keyboard), a user interface (UI) navigation device or cursor control device 914 (e.g., a mouse), a disk drive unit 716, a signal generation device 718 (e.g., a speaker), and a network interface device 720.

Machine-Readable Medium

The disk drive unit 716 includes a machine-readable medium 722 on which is stored one or more sets of instructions 724 and data structures (e.g., software instructions) embodying or used by any one or more of the methodologies or functions described herein. The instructions 724 may also reside, completely or at least partially, within the main memory 704 or within the processor 702 during execution thereof by the computer system 700, the main memory 704 and the processor 702 also constituting machine-readable media.

While the machine-readable medium 722 is shown in an exemplary embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of exemplary semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. The term "machine-readable medium" shall also be taken to include any non-transitory storage medium.

Transmission Medium

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the exemplary configurations may be implemented as a combined structure or resource. Similarly, structures and functionality presented as a single resource may be implemented as separate resources.

These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
receiving at an online consultation system a question associated with a predetermined category;
extracting a plurality of candidate topics from the received question;
applying a first term frequency inverse document frequency (TFIDF) filter to the extracted plurality of candidate topics to identify a first sorted list of the plurality of extracted candidate topics according to an affinity of the candidate topics to the predetermined category;
applying a second TFIDF filter to the first sorted list to identify a second sorted list of the plurality of extracted candidate topics according to an affinity of the candidate topics to the received question;
identifying as similar questions a plurality of previously submitted questions having topics matching the second sorted list of the plurality of extracted candidate topics;
creating excerpts of the identified similar questions by selecting one or more sections of each of the identified similar questions;
presenting to one or more users via the online consultation system the excerpts of the identified plurality of previously submitted questions
while the user is waiting for an answer to the question.

2. The method of claim 1, wherein the similar questions are made available to subscription users.

3. The method of claim 1, wherein after reviewing similar questions, the one or more users have the opportunity of accepting an answer to one of the plurality of previously submitted questions for a reduced fee.

4. The method of claim 1, wherein after reviewing similar questions, the one or more users are given an option to modify the received question.

5. The method of claim 1, wherein subscription users are allowed to search a database of previously submitted questions to identify questions including similar topics.

6. The method of claim 1, wherein the first sorted list of the plurality of extracted candidate topics ranks candidate topics occurring more often inside the predetermined category that outside the predetermined category higher than candidate topics occurring less often inside the predetermined category that outside the predetermined category.

7. The method of claim 1, wherein the second sorted list of the plurality of extracted candidate topics re-ranks the first ranking, where the second sorted list of the plurality of extracted candidate topics ranks candidate topics occurring more often inside the received question that within other questions in the predetermined category higher than candidate topics occurring less often inside the received question that within other questions in the predetermined category.

8. The method of claim 1, wherein extracting the plurality of candidate topics from the received question includes automatically performing, by a linguistic engine, sentence detection, tokenization, phrase extraction, and tagging of speech parts for the received question.

9. A topic extraction apparatus in an online consultation system, the apparatus comprising a plurality of engines for:
receiving at an online consultation system a question associated with a predetermined category;
extracting a plurality of candidate topics from the received question;
applying a first term frequency inverse document frequency (TFIDF) filter to the extracted plurality of candidate topics to identify a first sorted list of the plurality of extracted candidate topics according to an affinity to the predetermined category;
applying a second TFIDF filter to the first sorted list to identify a second sorted list of the plurality of extracted candidate topics according to an affinity to the received question;
identifying as similar questions a plurality of previously submitted questions having topics matching the second sorted list of the plurality of extracted candidate topics;
creating excerpts of the identified similar questions by selecting one or more sections of each of the identified similar questions;
presenting to one or more users via the online consultation system the excerpts of the identified plurality of previously submitted questions while the user is waiting for an answer to the question.

10. A non-transitory machine-readable storage medium having embodied thereon instructions which when executed by at least one processor, causes a machine to perform operations comprising:
receiving at an online consultation system a question associated with a predetermined category;
extracting a plurality of candidate topics from the received question;
applying a first term frequency inverse document frequency (TFIDF) filter to the extracted plurality of candidate topics to identify a first sorted list of the plurality of extracted candidate topics according to an affinity to the predetermined category;
applying a second TFIDF filter to the first sorted list to identify a second sorted list of the plurality of extracted candidate topics according to an affinity to the received question;
identifying as similar questions a plurality of previously submitted questions having topics matching the second sorted list of the plurality of extracted candidate topics;
creating excerpts of the identified similar questions by selecting one or more sections of each of the identified similar questions;
presenting to one or more users via the online consultation system the excerpts of the identified plurality of previously submitted questions while the user is waiting for an answer to the question.

* * * * *